(12) United States Patent
Zorin et al.

(10) Patent No.: US 12,393,464 B2
(45) Date of Patent: Aug. 19, 2025

(54) SELECTING BEST CLOUD COMPUTING ENVIRONMENT IN A HYBRID CLOUD SCENARIO

(71) Applicant: International Business Machines Corporation, Armonk, NY (US)

(72) Inventors: Anton Zorin, Waedenswil (CH); Manish Kesarwani, Bangalore (IN); Niels Dominic Pardon, Zurich (CH); Ritesh Kumar Gupta, Hyderabad (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 667 days.

(21) Appl. No.: 17/651,186

(22) Filed: Feb. 15, 2022

(65) Prior Publication Data

US 2023/0259401 A1    Aug. 17, 2023

(51) Int. Cl.
*G06F 9/50*    (2006.01)
*G06F 9/48*    (2006.01)
(Continued)

(52) U.S. Cl.
CPC .......... *G06F 9/5044* (2013.01); *G06F 9/4881* (2013.01); *G06F 9/5005* (2013.01); *G06F 9/5055* (2013.01); *G06F 9/5077* (2013.01); *G06F 11/3006* (2013.01); *G06F 11/3409* (2013.01)

(58) Field of Classification Search
None
See application file for complete search history.

(56) References Cited

U.S. PATENT DOCUMENTS 8,607,242 B2    12/2013  Clarke
9,124,498 B2     9/2015  Jung
(Continued)

OTHER PUBLICATIONS

Tricomi et al., "Optimal Selection Techniques for Cloud Service Providers", Nov. 4, 2020, IEEE Access. (Year: 2020).*
(Continued)

*Primary Examiner* — Qing Yuan Wu
(74) *Attorney, Agent, or Firm* — Joseph P. Curcuru (57) ABSTRACT

Embodiments for identifying an optimal cloud computing environment for a computing task is disclosed. Embodiments comprises receiving a computing task to be executed in a cloud computing environment, wherein the computing task requires a set of cloud computing environment parameter values of the cloud computing environment, pre-selecting a set of candidate cloud computing environments, each of which meets the set of cloud computing environment parameter values, ranking the candidate cloud computing environments using reward-based ranking parameter values of the candidate cloud computing environments as an additional selection constraint, and selecting the highest ranking cloud computing environment as the optimal cloud computing environment for the computing task. Furthermore, embodiments comprise executing the computing task in the optimal cloud computing environment, monitoring execution when executing the computing task, and updating parameter values of the reward-based ranking for the selected optimal cloud computing environment.

20 Claims, 7 Drawing Sheets

(51) Int. Cl.
   *G06F 11/30*     (2006.01)
   *G06F 11/34*     (2006.01)

(56) References Cited

U.S. PATENT DOCUMENTS

| | | | |
|---|---|---|---|
| 2015/0193246 A1* | 7/2015 | Luft | G06F 9/45533 718/1 |
| 2019/0158367 A1 | 5/2019 | Barooah | |
| 2020/0236169 A1 | 7/2020 | Vaddi | |
| 2021/0176266 A1 | 6/2021 | Ramamurthy | |

OTHER PUBLICATIONS

Hsu et al., "Scout: An Experienced Guide to Find the Best Cloud Configurations", Mar. 4, 2018, North Carolina State University. (Year: 2018).*

Alipourfard, et al., "CherryPick: Adaptively Unearthing the Best Cloud Configurations for Big Data Analytics", Proceedings of the 14th USENIX Symposium on Networked Systems Design and Implementation (NSDI '17), Mar. 27-29, 2017, pp. 469-482, <https://www.usenix.org/conference/nsdi17/technical-sessions/presentation/alipourfard>.

Auer, et al., "The Nonstochastic Multiarmed Bandit Problem", SIAM Journal on Computing, 2002, vol. 32, No. 1, Abstract Only, 2 pages, <https://epubs.siam.org/doi/10.1137/S0097539701398375>.

Besbes, et al., "Stochastic multi-armed-bandit problem with non-stationary rewards", Advances in Neural Information Processing Systems, vol. 27, 2014, pp. 199-207.

Mell, et al., "The NIST Definition of Cloud Computing", National Institute of Standards and Technology, Special Publication 800-145, Sep. 2011, 7 pages.

International Search Report and Written Opinion for Application No. PCT/IB2023/051109, dated Apr. 12, 2023, 11 pgs.

Sahoo et al., "A Learning Automata-Based Scheduling for Deadline Sensitive Task in The Cloud," IEEE Transactions on Services Computing, vol. 14, No. 6, Nov./Dec. 2021, pp. 1687-1699.

Tang et al., "Representation and Reinforcement Learning for Task Scheduling in Edge Computing," IEEE Transactions on Big Data, vol. 8, No. 3, May/Jun. 2022, pp. 795-808.

Tuli et al., "Dynamic Scheduling for Stochastic Edge-Cloud Computing Environments using A3C learning and Residual Recurrent Neural Networks," IEEE Transaction on Mobile Computing, arZIV:2009/02186 V1, Sep. 1, 2020, pp. 1-16.

* cited by examiner

SELECTING BEST CLOUD COMPUTING ENVIRONMENT IN A HYBRID CLOUD SCENARIO

BACKGROUND

The invention relates generally to a method for identifying an optimal cloud computing environment, and more specifically, to a computer-implemented method for identifying an optimal cloud computing environment for a computing task. The invention relates further to a cloud computing environment selector system for identifying an optimal cloud computing environment for a computing task, and a computer program product.

Cloud computing, which is to be understood in a broader sense as a mixture of technical, organizational and legal aspects, has been on a steady growth path for many years now. It has started with pure public cloud environments and has now reached a level of complexity that even experts can hardly overlook. In addition to public clouds, also private clouds, hybrid clouds, managed clouds and even more environments are now commonplace. Hence, there are typically a variety of different options for performing a specific task or service but it is not always easy to decide where to perform the particular task. In a hybrid cloud scenario, an organization has several alternative cloud environments to schedule a job. The job may be executable in a stand-alone environment which may only comprise a single cloud or it may be distributed and may therefore require a cluster of clouds to execute.

In typical situations for enterprises that are faced with deciding where to execute a computing task, the problem may be solved either through manual or more or less static repetitive decisions. However, this may not be the best solution for an enterprise in terms of performance, reliability, cost and/or governance rules. Very often, administrators decide in favor of the cloud environment they are already using. A dynamic selection process typically does not happen.

Therefore, a more dynamic and automatic optimization of the selection process may be required as to the technical and/or cloud computing environment in which a given computer task is to be carried out. This may help organizations to save both, time and money, as this schedule tasks are more likely to be successfully scheduled (as opposed to failing).

SUMMARY OF THE INVENTION

According to one aspect of the present invention, a computer-implemented method for identifying an optimal cloud computing environment for a computing task may be provided. The method may comprise receiving a computing task to be executed in a cloud computing environment, wherein the computing task requires a set of cloud computing environment parameter values of the cloud computing environment, pre-selecting a set of candidate cloud computing environments, each of which meets the set of cloud computing environment parameter values, ranking the candidate cloud computing environments using reward based ranking parameter values of the candidate cloud computing environments as an additional selection constraint, and selecting the highest ranking cloud computing environment as the optimal cloud computing environment for the computing task.

Moreover, the method may comprise executing the computing task in the optimal cloud computing environment, monitoring execution when executing the computing task, and updating parameter values of the reward-based ranking for the selected optimal cloud computing environment.

According to another aspect of the present invention, a cloud computing environment selector system for identifying an optimal cloud computing environment for a computing task may be provided. The system may comprise a processor and a memory, communicatively coupled to the processor, wherein the memory stores program code portions that, when executed, enable the processor, to receive a computing task to be executed in a cloud computing environment, wherein the computing task requires a set of cloud computing environment parameter values of the cloud computing environment, pre-select a set of candidate cloud computing environments, each of which meets the set of cloud computing environment parameter values, rank the candidate cloud computing environments using reward-based ranking parameter values of the candidate cloud computing environments as an additional selection constraint, and select the highest ranking cloud computing environment as the optimal cloud computing environment for the computing task.

Additionally, the processor may also be enabled to execute the computing task in the optimal cloud computing environment, monitor execution when executing the computing task, and updating parameter values of the reward based ranking for the selected optimal cloud computing environment.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Preferred embodiments of the invention will be described, by way of example only, and with reference to the following drawings.

DETAILED DESCRIPTION

In the context of this description, the following conventions, terms and/or expressions may be used:

The term 'cloud computing'—and equivalently the more specific term 'cloud service environment'—may in this context be interpreted as a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of at least five essential characteristics, three service models and four deployment models.

Essential characteristics of cloud computing comprise: (i) on-demand self-service, wherein on-demand self-service enables a consumer to have unilaterally provision computing capabilities, such as server time and network storage, when needed automatically without requiring human interaction with each service provider, (ii) broad network access, wherein broad network access capabilities are available over the network and accessed through standard mechanisms that promote use by heterogeneous thin or thick client platforms (e.g., mobile phones, laptops, and PDAs), (iii) resource pooling, wherein resource pooling pools a provider's computing resources to serve multiple consumers using a multi-tenant model with different physical and virtual resources, (iv) dynamically assigning and reassigning according to consumer demand rapid elasticity, wherein rapid elasticity represents capabilities that can be rapidly and elastically provisioned, in some cases automatically, to quickly scale out and rapidly release to quickly scale in, and wherein rapid elasticity, to the consumer, enable unlimited provisioning availability and is purchasable in any quantity at any time, and (v) measured service, wherein measured service represents Cloud systems automatically control and optimize resource use by leveraging a metering capability at some level of abstraction appropriate to the type of service (e.g., storage, processing, bandwidth, and active user accounts). Resource usage can be monitored, controlled and reported providing transparency for both, the provider and consumer of the utilized service. Resource pooling may also comprise a sense of location independence in that the customer generally has no control or knowledge over the exact location of the provided resources, but may be able to specify location at a higher level of abstraction (e.g., country, state, or datacenter). Examples of resources include storage, processing, memory, network bandwidth and virtual machines.

Service models for cloud computing use comprise: (i) Cloud Software as a Service (SaaS), (ii) Cloud Platform as a Service (PaaS), and (iii) Cloud Infrastructure as a Service (IaaS). SaaS comprises the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. PaaS comprises the capability provided to the consumer is to deploy onto the cloud infrastructure consumer-created or acquired applications created using programming languages and tools supported by the provider. The consumer does not manage or control the underlying cloud infrastructure including network, servers, operating systems, or storage, but has control over the deployed applications and possibly applications hosting environment configurations. IaaS comprises the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of selected networking components (e.g., host firewalls).

Deployment models for cloud computing comprise:
(i) Private cloud. The cloud infrastructure is operated solely by an organization. It may be managed by the organization or a third party and may exist on premise or off premise.
(ii) Community cloud. The cloud infrastructure is shared by several organizations and supports a specific community that has shared concerns (e.g., mission, security requirements, policy, and compliance considerations). It may be managed by the organizations or a third party and may exist on premise or off premise.
(iii) Public cloud. The cloud infrastructure is made available to the general public or a large industry group and is owned by an organization selling cloud services.
(iv) Hybrid cloud. The cloud infrastructure is a composition of two or more clouds (private, community, or public) that remain unique entities but are bound together by standardized or proprietary technology that enables data and application portability (e.g., cloud bursting for load-balancing between clouds).

It may be noted that cloud software takes full advantage of the cloud paradigm by being service-oriented with a focus on statelessness (with exceptions), low coupling, modularity, and semantic interoperability.

Additionally, the term or in short simply 'cloud' may denote—based on the above and in particular for the concept described here—a set of network, computing and storage systems with related operating systems, required virtualization and security as well as application services. These application services may be triggered remotely in order to be executed, e.g., as part of a specific task or job. The services may receive input data, execute operation and deliver back the results. In another case, the job may be an execution of a complete virtual machine. In this case, the cloud computing environment would activate or receive the virtual machine—potentially including some application logic—execute and return back respective results.

The term 'best cloud computing environment' could be interpreted in a couple of different ways. The predominant interpretation here may be directed to a reliable execution within the defined constraints. The constraints may be related to technical requirements for the execution of the task, like maximum execution time, required memory, network bandwidth, intermediate storage volume, or security constraints or governmental requirements (e.g., in the financial sector). In an alternative embodiment, the best cloud computing environment may also relate to the requirements, like organizational or geographic boundaries, and the like.

The term 'computing task' may denote a job to be executed from a calling program or programming environment. The computing task may be intended to be scheduled and executed in a selected cloud computing environment. The computing task may comprise a plurality of sub-tasks, sup-processes or sub-programs. These may be distributed across different cloud computing environments or clouds in a multi-cloud environment.

The term 'cloud computing environment parameter values' may relate to requirements that are constraints necessary for a cloud computing environment to be able to execute the computing task.

The term 'candidate cloud computing environments' may denote the result of a pre-selection of filtering of known or available cloud computing environments to be finally selected as the best suitable cloud computing environment. The candidate cloud computing environments may fulfill at least the cloud computing environment parameter values, i.e., the constraints to execute the computing task to be scheduled.

The term 'reward-based ranking parameter values' may denote in one embodiment simple digital values, e.g., "+1" for a successful execution of the job/task and "−1" for an unsuccessful execution of the job/task. However, more complex assessment algorithms for assessing whether a job has been executed successfully may be used instead.

The proposed computer-implemented method for identifying an optimal cloud computing environment for a computing task may offer multiple advantages, technical effects, contributions and/or improvements:

The dilemma of the administrator to select a best suitable cloud computing environment for a computing task or a job to be scheduled and executed may be solved. The proposed method—as well as the related system—may be executed permanently for jobs to be scheduled into cloud computing environments. The method may "learn" which cloud computing environment may be best to execute a given computing task at hand. This may be based on constantly running assessments resulting statistical values to be used for the decision process.

However, the selection process is not static. Instead, an exploration parameter value can be used to deviate from the standardized process that would all ways arrive at the same cloud computing environment for a given task, in order to "try out new things" with a certain probability.

Furthermore, the selection process may also be skipped for a predefined time window—which may be defined as time in seconds or also as a number of tasks to be scheduled—if one of the suitable clouds has been performed significantly better—in particular, δ times better than the nearest competitor (i.e., the next best ranked cloud)—and then comparable cloud computing environments.

Hence, a closed loop process may be created which may constantly learn—and thus be optimized—and evaluate about available cloud computing environments, their success and failure rates to perform comparable tasks so that it each time a job has to be scheduled, a new selection process may be started for dynamically determine the best cloud computing environment—according to criteria defined in the subscription—for a computing task to be scheduled.

Hence, a basic strategy is to keep track of the success probability to determine the best location of a cloud system to be used. But it will not be a good idea to keep selecting the cloud with the highest success probability at the current time and not learning the success probability of other clouds. It may happen that a particular cloud computing environment might have a higher success probability in the long run, but it is not given enough chances to prove it. Further, the environment's dynamic nature due to, e.g., overload, memory leak, resource health, execution environment and/or heating/cooling issues may potentially reduce the throughput of some cloud environments in the long-term deployment. Therefore, the success probability distribution of different clouds may evolve over time, so continuous learning is needed and can be achieved by the proposed solution.

In the following, additional embodiments of the inventive concept—applicable for the method as well as for the system—will be described.

According to one permissive embodiment of the method, the cloud computing environment may be a single cloud computing environment or a multi-cloud computing environment. Hence, the proposed solution is independent of the organization of the used cloud services. They may originate from a private cloud, a public cloud, a mixture thereof or a mixture of different clouds of different providers. This aspect may remain completely transparent to the proposed method.

According to another useful embodiment of the method, the cloud computing environment comprises geographically distributed computing infrastructure components. This may also take into account that different technical, organizational, legal and/or security/privacy restrictions may apply to the different service providers owning and organizing the cloud computing infrastructures.

According to one advantageous embodiment, the method may also comprise determining or defining, at an initialization time, an exploration parameter value—e.g., a γ value in the range (0, 1)—and/or a maximum deviation parameter value, e.g., a δ maximum deviation value. These parameter values enable flexibility in the proposed method so that not always the same cloud services of the same cloud service providers are selected. E.g., the γ value may be used to explore another "random" cloud service instead of the one that would be selected after applying a pure stringent procedural selection process. This way, a natural randomness may be introduced in the selection process and the method may become "curious" to try other execution options, i.e., so far untested cloud computing environments.

According to another advantageous embodiment, the method may also comprise: if one of the candidate cloud computing environments has a ranking that is greater than the a maximum deviation of the ranking of all other value candidate cloud computing environments using the selected best one cloud computing environments for received computing tasks in a predefined time window. This may be seen as the conservative element of the proposed solution because no ranking is required for the next couple cloud computing environments to be selected to execute the task. This may make the selection process leaner and more stable, and random explorative selections (see above) would be suppressed. Therefore, if at a point in time a specific cloud computing environment ranks δ-times better than other potential cloud computing environments, one may stop the learning process for a time window and select the best cloud for the next couple of task assignments.

According to a further developed embodiment of the method, the ranking may also be influenced by the exploration parameter value. This may refer back were the γ value in the range (0, 1) has been mentioned first. The consequence is that not always the highest ranking cloud computing environment may be chosen as the selected one but with some—relatively low, but influenceable by an operator—probability also another cloud computing environment may be tested. This may be seen as classical weighted trial and error principle.

According to an advanced embodiment, the method may also comprise maintaining a priority ordering of all candidate clouds at all times. This way, the knowledge of past experiences may be used for a suitable cloud computing environment. The results may also be used for further detailed analysis in order to derive reliability trends of certain cloud computing services over time. If the reliability value may drop below a predefined threshold value, the cloud computing environment may be excluded from ranking for a predefined time window.

According to a further enhanced embodiment, the method may also comprise re-optimizing existing future schedules for computing tasks to be executed in case of a failure to execute a scheduled computing task. Here, a failure may be defined as a situation in which a system—i.e., a cloud computing service—may be down for some planned maintenance; alternatively, the cloud service may be over-subscribed, i.e., having only a limited availability. This may not be marked as a failure of the respective service and the specific cloud computing service may not be marked as "failed". However, for a time window of predefined length, this cloud computing environment may no longer be seen as potential cloud computing environment and may be excluded from the selection process for the predefined time.

According to an optional embodiment, the method may also comprise sharing parameters about the monitored execution—i.e., success or failure for a certain requirement—with other users. In particular, the statistics of the execution from one or more users or requesting systems may be shared with other constituents. This way, a self-optimizing process may be established for a selection of a best fit for a certain cloud computing task. The selection process may then—with the help of the method proposed here—be optimized across a plurality of users. Through this, it would become possible to average the experience of different requesters operating under different technical, organizational and legal conditions. This may render the selection process more stable, reliable and predictable.

In the following, a detailed description of the figures (FIG.) will be given. All instructions in the figures are schematic. Firstly, a block diagram of an embodiment of the inventive computer-implemented method for identifying an optimal cloud computing environment for a computing task is given. Afterwards, further embodiments, as well as embodiments of the cloud computing environment selector system for identifying an optimal cloud computing environment for a computing task will be described.

Figure 1:
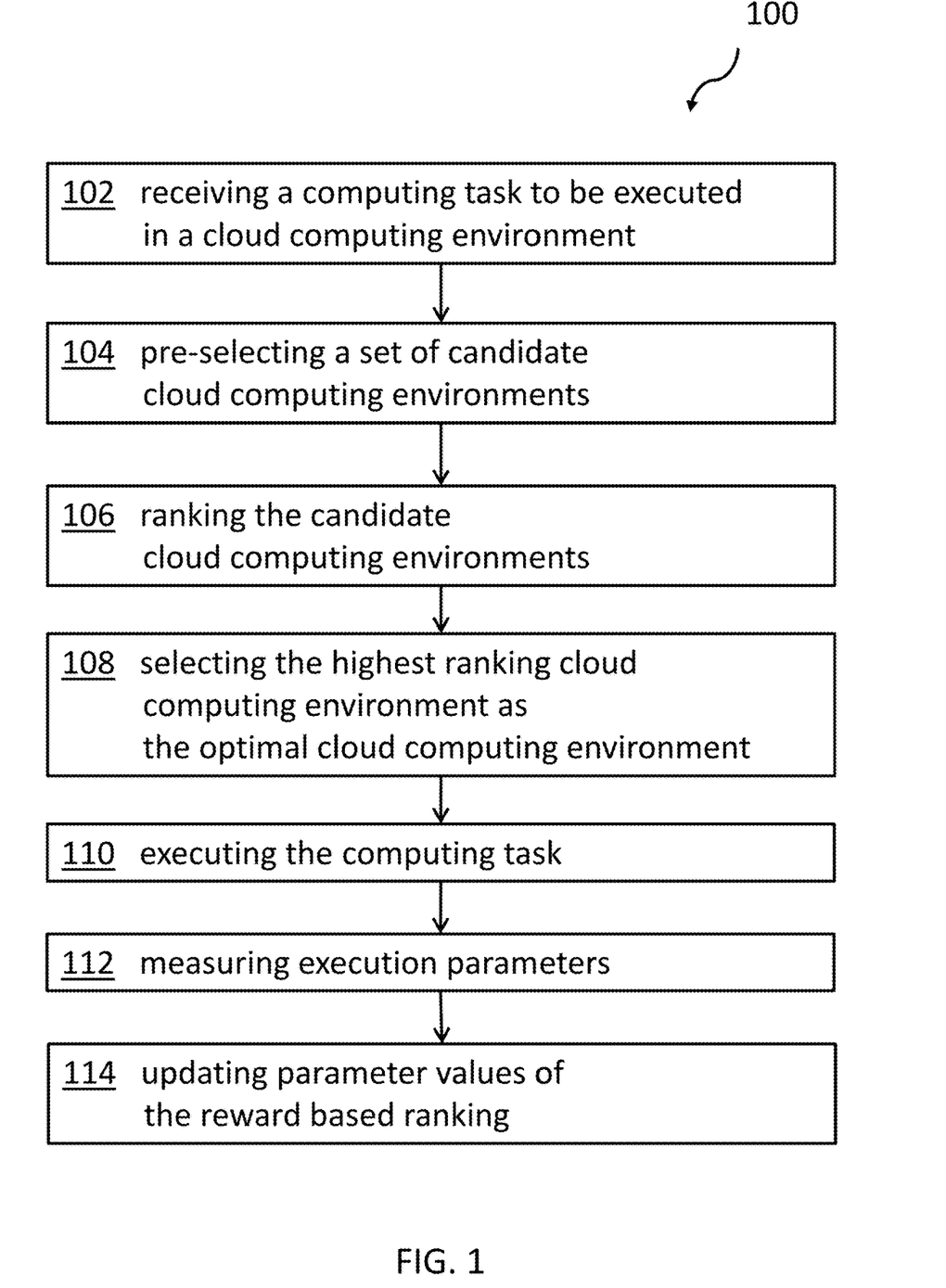
FIG. 1 shows a block diagram of an embodiment of the inventive computer-implemented method for identifying an optimal cloud computing environment for a computing task.

FIG. 1 shows a block diagram of a preferred embodiment of the computer-implemented method 100 for identifying an optimal cloud computing environment for a computing task. The method 100 comprises receiving, 102 a computing task to be executed in a cloud computing environment—which can be a single or multiple cloud computing environment—wherein the computing task requires a set of cloud computing environment parameter values of the cloud computing environment, i.e., execution constraints.

The method 100 further comprises pre-selecting or filtering out, 104, a set of candidate cloud computing environments, each of which meets the set of cloud computing environment parameter values—i.e., candidate clouds that satisfy all constraints. The method 100 also comprises ranking, 106, the candidate cloud computing environments using reward-based ranking parameter values of the candidate cloud computing environments as an additional selection constraint. Thereby, the reward-based ranking parameter values are a measure for expressing a likelihood of success or success ratio according to their ability to meet the cloud computing environment parameter values. Furthermore, the method 100 comprises selecting, 108, the highest ranking—i.e., the best—cloud computing environment as the optimal cloud computing environment for the computing task. In practical examples, this may also comprise more than one best cloud computing environment, in particular in the case in which a multi-cloud computing environment is required for the task.

Additionally, the method 100 comprises executing, 110, the computing task in the optimal cloud computing environment, monitoring, 112, execution—i.e., respective parameter values—when executing the computing task, and updating, 114 parameter values of the reward-based ranking for the selected optimal cloud computing environment. Basically, this may be represented by a statistic of success and failure of an execution of a specific task.

Figure 2:
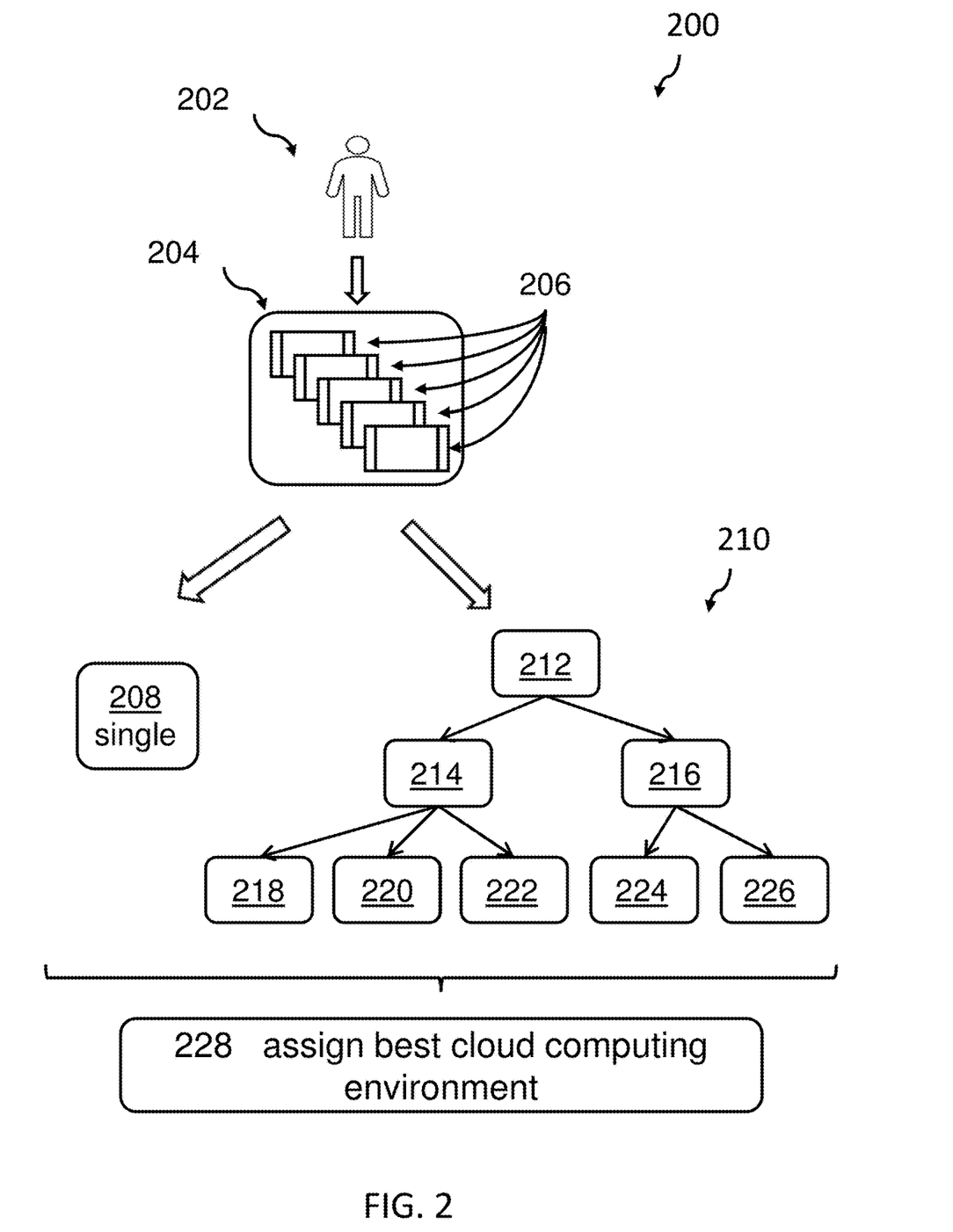
FIG. 2 illustrates a block diagram of a typical situation when selecting a cloud computing environment.

FIG. 2 illustrates a block diagram 200 of a typical situation when selecting a cloud computing environment. A user 202 has a request to execute a computing task 204. The computing task 204 may require a plurality of different process steps or sub-processes. Some tasks 204 can be executable in a single, standalone cloud computing environment 208, or—more complex tasks—may require a multi-cloud computing environment 210, e.g., for parallel execution. This may be represented by the tree structure starting with a root task 212 from which sub-tasks or sub processes may be branched off to other cloud services, eventually in other cloud computing environments. In a possible case, all sub-tasks 206 may be executed in another cloud computing environment, here represented by the services 214, 216, . . . , 226. Faced with such a situation in which the execution of the task or parts thereof can be executed in different cloud computing environments, the problem is in assigning, 228, each sub-task of the overall task 204 to the optimal cloud computing environment optimized according to set of optimization parameters. These may comprise performance aspects, privacy aspects, other security aspects, as well as legal and monetary aspects. Hence, a multi-dimensional problem is to be solved.

Figure 3:
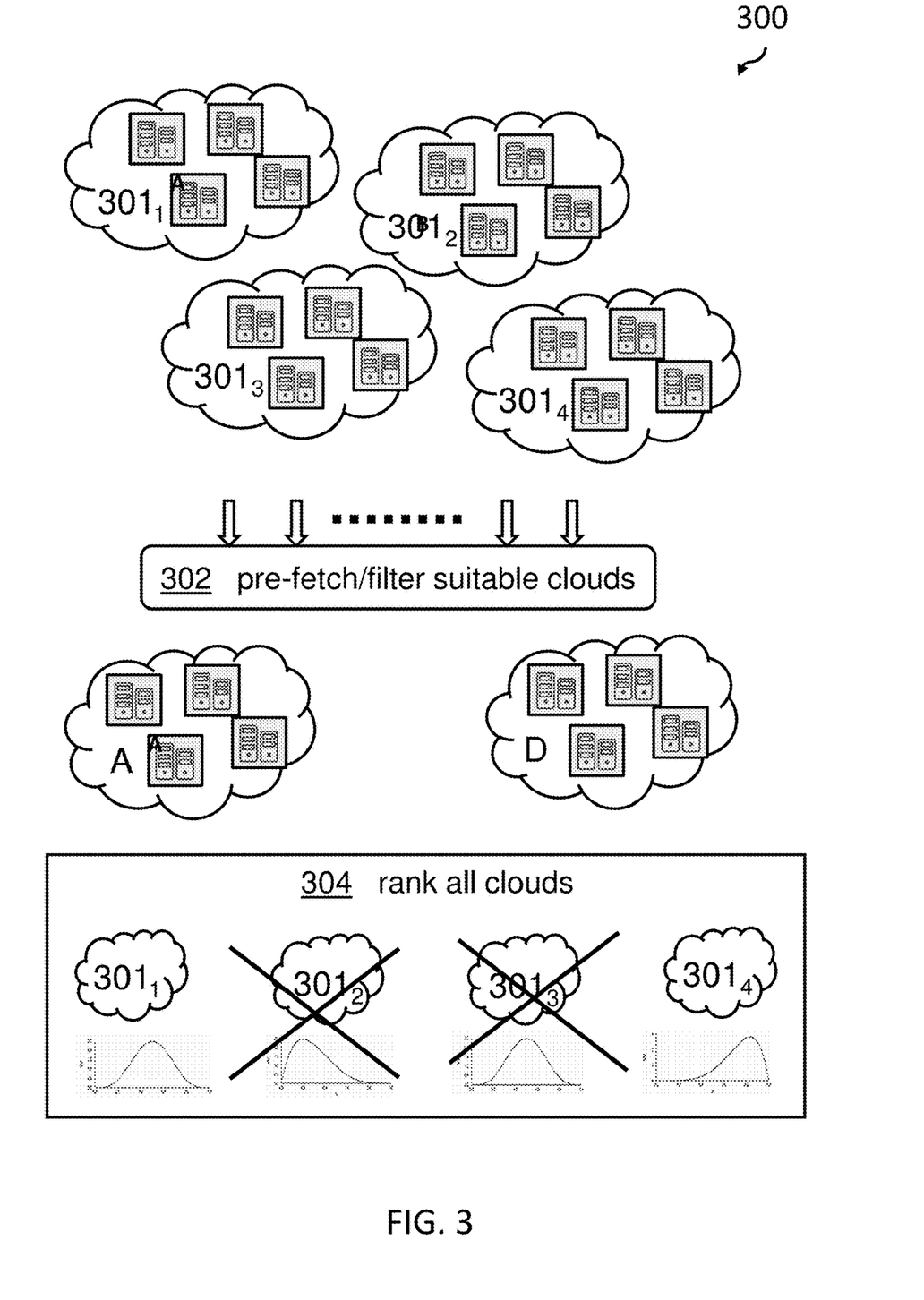
FIG. 3 shows a block diagram of a typical scenario in a hybrid cloud computing environment.

FIG. 3 shows a block diagram of a typical scenario 300 in a hybrid cloud computing environment. An enterprise may have contracts with different cloud providers, e.g., for the usage of the privately managed, private or public cloud $301_1$, $301_2$, $301_3$, and $301_4$. These cloud computing environments may be denoted as available clouds. Based on the abilities of the different cloud computing environments, a pre-fetch or filter activity 302 selects suitable cloud computing environments which are conformant with the known constraints for the task to be executed. In this case, the cloud computing environments $301_1$ and $301_4$ have been selected as suitable for the task. In various embodiments, not depicted in FIG. 3, typical scenario 300 in a hybrid cloud computing environment may comprise a plurality of private or public clouds (e.g., private or public clouds $301_{1-N}$), wherein N represents a positive integer, and accordingly the number of scenarios implemented in a given embodiment of the present invention is not limited to those depicted in FIG. 3.

This was possible, because the selection process was able to rank, 304, all available cloud computing environments $301_1$, $301_2$, $301_3$, and $301_4$ in a dynamic process to recognize that only cloud computing environments $301_1$ and $301_4$ can fulfill the requirements for the tasks. Hence, because of the known historical data (sketched out as the x-y-diagrams below the clouds) a preselection step could be executed.

Figure 4:
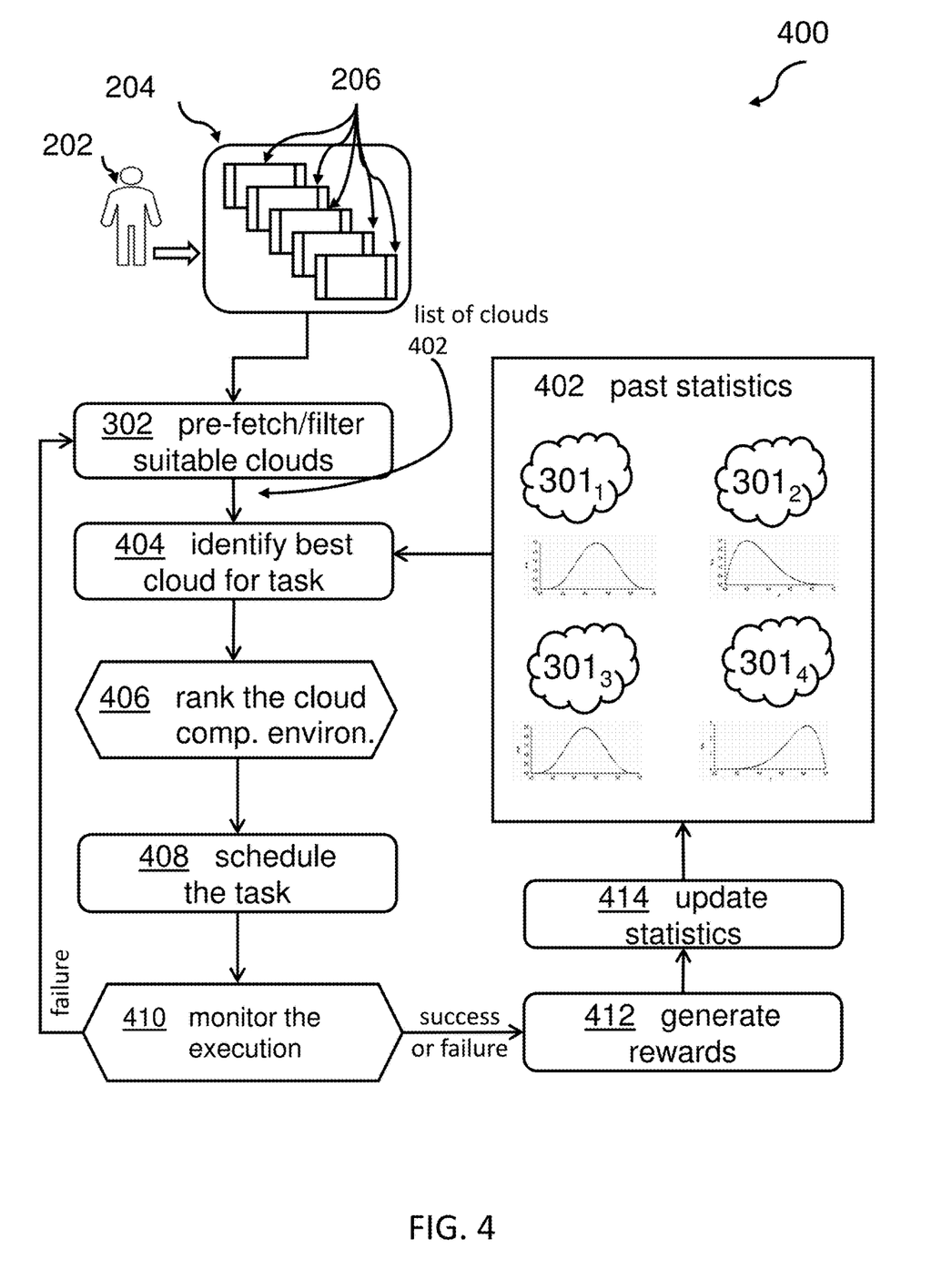
FIG. 4 shows a block diagram of an embodiment of the proposed cloud computing selection process.

FIG. 4 shows a block diagram of an embodiment of the proposed cloud computing selection process 400. Again, the user 202 or the executed computing process may require an execution of the task 200 for comprising the plurality of sub-tasks 206. From the list of potential clients, a list of suitable clouds is derived, pre-fetched or filtered, 302, using traditional requirements/abilities comparison, compare FIG. 3).

Next, the best cloud for the task is to be identified, 404. Thereby, for the selection process, statistics $304_1$-$304_4$ (as already shown in FIG. 3) of past execution statistics about available clouds are used advantageously. Such data may be stored in a cloud performance storage system as statistical data and/or past statistical data (past statistics).

In a next step, the best cloud for the task has to be identified, 404. For this, the suitable cloud computing environments are ranked, 406, based on the statistical data 402, and the cloud computing environment with a higher score wins. In this computing environment, the task 204 is scheduled to be executed, 408.

The execution is then monitored, 410. In case of a failure of the execution, the selection process restarts with the pre-fetch/filter step for suitable clouds, 302 (compare FIG. 3). In case the monitoring 410 the execution returns the status "successfully execution", a "reward" is generated, 412 to be stored in the statistics 402. This is performed by the update statistics 414 activity. As a consequence, a close loop process has been created which allows a dynamic and optimized process for selecting one or more cloud computing environments, either single cloud or multiple-cloud.

However, this does not show the complete picture of the method proposed here. If only the above-described process would be implemented, it would be a very conservative selection process. It would manifest an initial random selection for cloud computing environments for a specific task, having specific constraints, as long as no failure happen. But potentially other cloud computing environments would not be tried out. For this, variables are introduced in the selection process leaning on the multi-armed bandit problem.

It may be assumed that an IT administrator responsible for scheduling a task has four potential clouds to select from to schedule a stand-alone job (the example can easily be extended to a distributed task which requires multiple clouds for a job). Each of the distinct cloud computing environments will be considered as a bandit arm. It is also assumed that, since at the beginning there is no extra information about past performance, that all clouds have an equal probability of success. So, initially, all the arms (i.e., clouds) are equally likely to be selected as best arm. Next, one starts the cloud selection for incoming jobs using the adversarial bandit problem instance to select the most likely arm at each time instance. Then, the job is executed on the cloud and the success or failure of the cloud is recorded. Since there is no additional information about past performance at the beginning, it is also assumed that all clouds have the same probability of success. Therefore, all arms (i.e., clouds) are initially selected as the best arm with the same probability for success.

Next, one starts the cloud selection for incoming jobs by using the opposing instance to select the most likely arm at each time instance. Then, the job is executed in the cloud and the success or failure of the cloud is recorded. It may be assumed that a successful job execution generates the reward of "+1" and a failure of executing the job generates a reward of "−1". Based on this, the selection probability of all the arms is updated and the process is repeated. The rewards system may be more sophisticated reflecting a more granular determination of success and failure. However, the general underlying problem does not change.

At initialization time of the concept proposed here, an exploration parameter value γ is selected in, e.g., the range (0, 1). As a consequence, the probability for exploring a random cloud should be γ.

Furthermore, a maximum deviation value δ is also selected. This may be used at any time if one of the selected cloud computing environments is δ better than any other suitable cloud in terms of its ranking; the selection process for new tasks can be set to an inactive status for a predefined time window and the selected cloud computing environment can be reselected again for the next couple of jobs within the predefined time window.

The methodology introduced is also based on a weight factor $w_i$ for each of the cloud computing environments, which is initially equal to 1, since cloud computing environments have the same likelihood of being selected:

$$w_i = 1 \text{ for } 1=1, \ldots K,$$

K=number of available cloud computing environments.

Next, for each subsequent job or task request at t=1, 2, . . . , $$p_i(t)=(1-\gamma)(w_i(t)/\Sigma(\text{from } j=1 \text{ to } K) \text{ of } w_j(t))+\gamma/K, i=1, \ldots K,$$

one (symbolically) "draws arm $i_t$" from the probabilities $p_1(t), \ldots, p_K(t)$,
selects the cloud computing environment corresponding to the selected it,
executes the task on the selected cloud,
records the reward $x_j(t)$ (e.g., "+1", "−1"), and
updates the cloud weights, i.e.,
for j=1, K, set
$x'_j(t)=x_j(t)/p_j(t)$, if $j=i_t$ and =0 otherwise, and $$w_j(t-1)=w_j(t)\exp((\gamma * x'_j(t))/K);$$

thereby, "j" should be understood as a numerical integer identifier of a cloud and $w_j(t+1)$ is the updated weight factor value for a cloud after an execution of a job/task.

If the selected parameter values have been selected wisely, on average, always an optimal cloud computing environment (or to stay in the picture, an optimal arm) can be selected.

At any point in time, if for any arm (i.e., any cloud), the probability of selecting that arm exceeds the maximum deviation threshold value δ, i.e., for all i, j in 1, . . . , K $$|p_i(t)-p_j(t)| \text{ is equal or larger than } \delta.$$

In this case, the exploration or learning phase can be stopped and the cloud corresponding to the "best arm" with highest probability will be selected for the next time window for jobs, in particular for comparable jobs. However, it should also be noted that only the exploration is temporarily paused, but the statistics are still be updated after each job assignment and execution in order to keep the statistics up-to-date.

With this variability at two ends—i.e., δ and γ, unbalance and biased selection processes can be overcome because randomness comes into play. Accidentally selected "wrong" cloud computing environments that were not the best for a given task would be favorably sorted out advantageously by the proposed concept.

Figure 5:
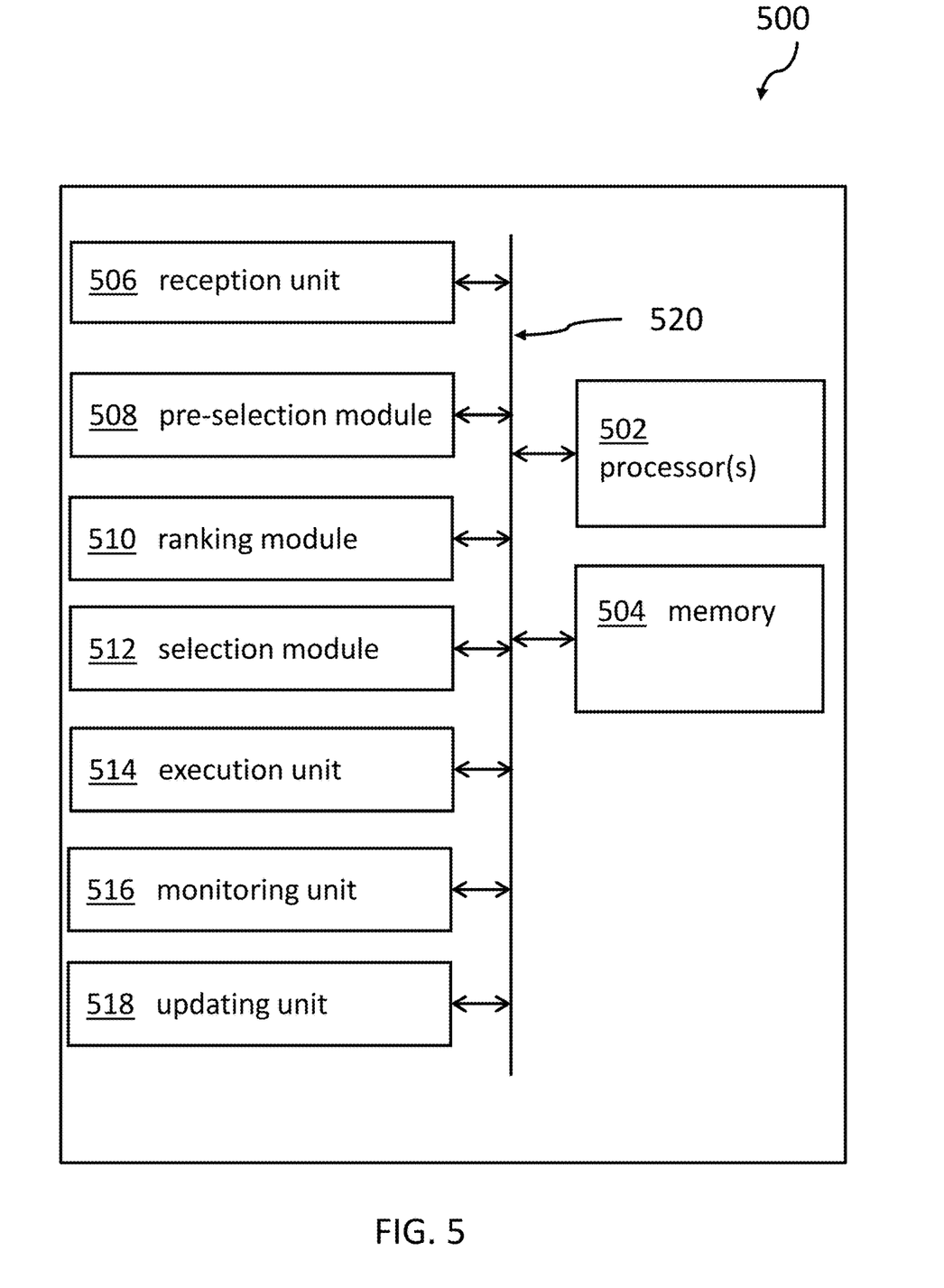
FIG. 5 shows a block diagram of an embodiment of the inventive cloud computing environment selector system for identifying an optimal cloud computing environment for a computing task.

FIG. 5 shows a block diagram of an embodiment of the selector system 500 for identifying an optimal cloud computing environment for a computing task. The system comprises a processor 502 and a memory 504, communicatively coupled to the processor 502, wherein the memory stores program code portions that, when executed, enable the processor 502, to receive—in particular by the reception unit 506—a computing task to be executed in a cloud computing environment, wherein the computing task requires a set of cloud computing environment parameter values of the cloud computing environment, and to pre-select—in particular by the pre-selection module 508—a set of candidate cloud computing environments, each of which meets the set of cloud computing environment parameter values.

The processor 502 is further enabled to rank—in particular by the ranking module 510—the candidate cloud computing environments using reward-based ranking parameter values of the candidate cloud computing environments as an additional selection constraint, and select—in particular by the selection module 512—the highest ranking cloud computing environment as the optimal cloud computing environment for the computing task.

Furthermore, the processor is additionally enabled to execute—or initiate an execution, in particular, by the execution unit 514—the computing task in the optimal cloud computing environment, to monitor—in particular, by the monitoring unit 516—execution when executing the computing task, and to updating—in particular by the updating unit 518 parameter values of the reward based ranking for the selected optimal cloud computing environment.

It shall also be mentioned that all functional units, modules and functional blocks in particular, the processor 502, the memory 544, the reception unit 506, the pre-selection module 508, the ranking module 510, the selection module 512, the execution unit 514, the monitoring unit 516, and the updating unit 518—may be communicatively coupled to each other for signal or message exchange in a selected 1:1 manner. Alternatively the functional units, modules and functional blocks can be linked to a system internal bus system 520 for a selective signal or message exchange.

Figure 6:
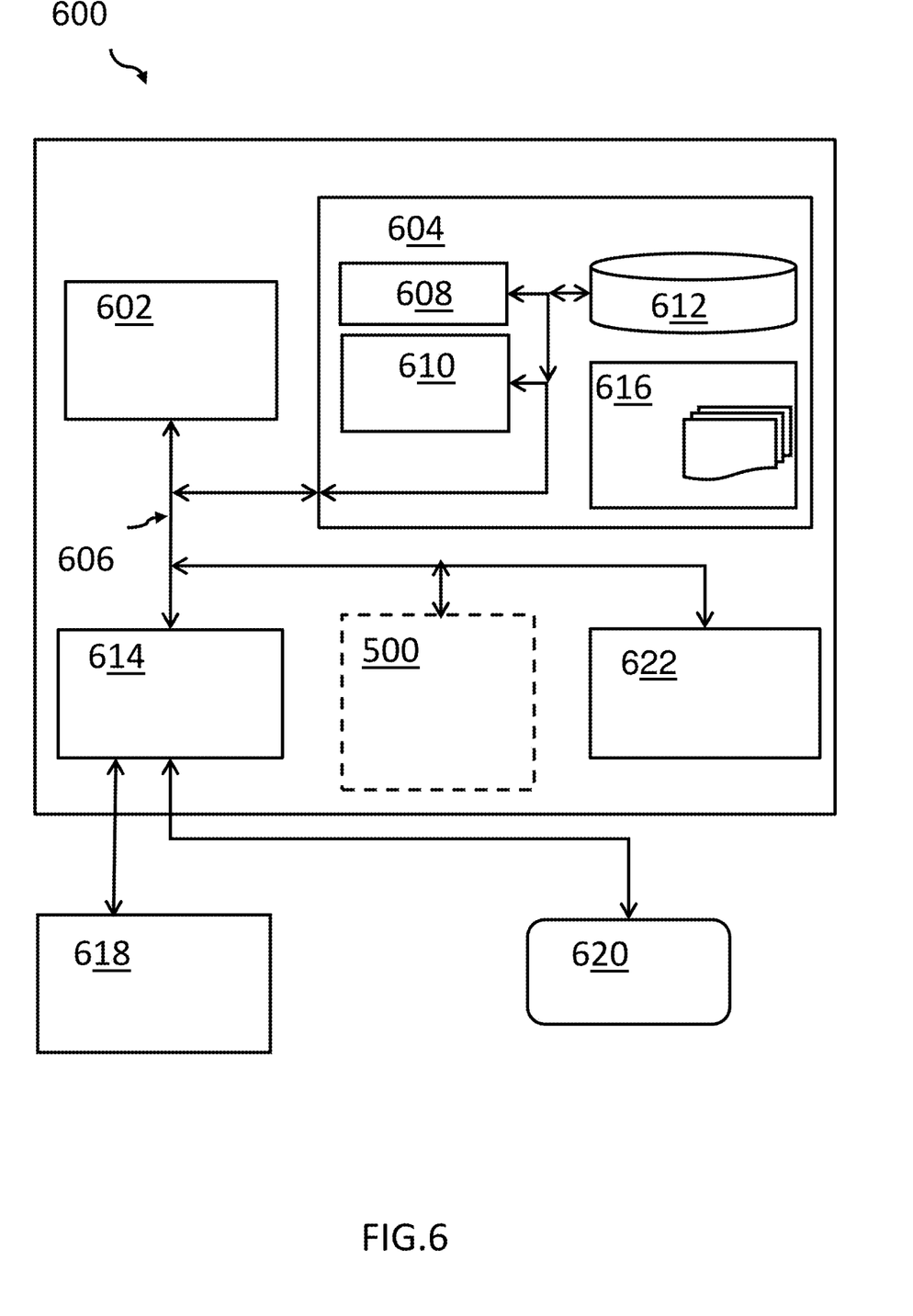
FIG. 6 shows an embodiment of a computing system comprising the system according to FIG. 5.

Embodiments of the invention may be implemented together with virtually any type of computer, regardless of the platform being suitable for storing and/or executing program code. FIG. 6 shows, as an example, a computing system 700 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the cloud computing environments selector system 500 for identifying an optimal cloud computing environment for a computing task may be attached to the bus system 606.

Figure 7:
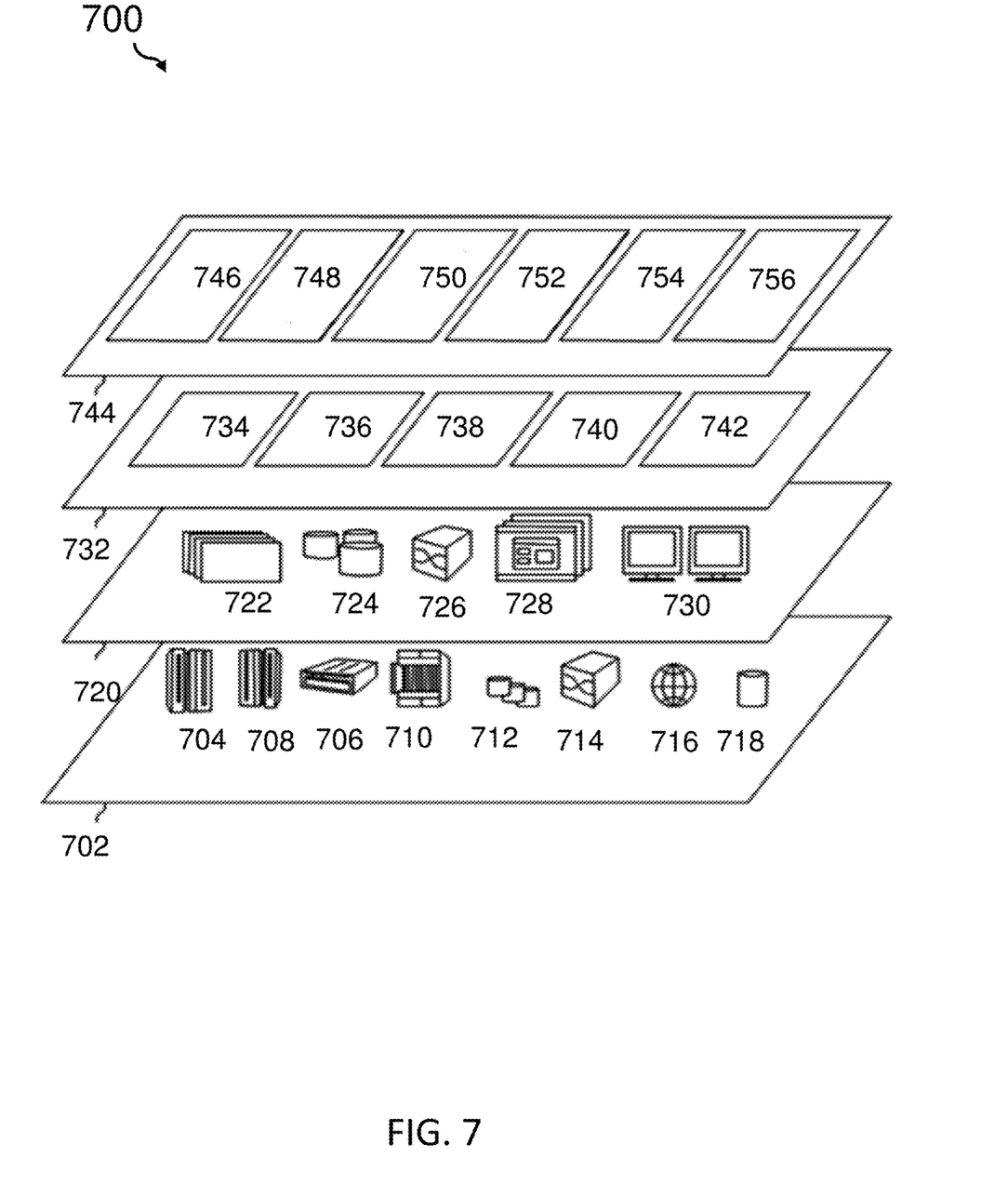
FIG. 7 shows a cloud computing environment in which at least parts of the inventive concept may be deployed.

FIG. 7 shows a cloud computing environment 700 in which at least parts of the inventive concept may be deployed. A set of functional abstraction layers provided by a cloud computing environment is shown. It should be understood in advance that the components, layers, and functions, shown in FIG. 7, are intended to be illustrative only, and embodiments of the invention are not limited thereto. As depicted, the following layers and corresponding functions are provided: Hardware and software layer 702 include hardware and software components. Examples of hardware components include: mainframes 704; servers 706; RISC (Reduced Instruction Set Computer) architecture based servers 708; blade servers 710; storage devices 712; networks 714 and networking components 714. In some embodiments, software components include network application server software 716 and/or database software 718.

Virtualization layer 720 provides an abstraction layer from which the following examples of virtual entities may be provided: virtual servers 722; virtual storage 724; virtual networks 726, including virtual private networks; virtual applications and operating systems 728; and virtual clients 730. In one example, management layer 732 may provide the functions described below. Resource provisioning 734 provides dynamic procurement of computing resources and other resources that are utilized to perform tasks within the cloud computing environment. Metering and pricing 736 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 738 provides access to the cloud computing environment for consumers and system administrators. Service level management 740 provides cloud computing resource allocation and management such that required service levels are met. Service Level Agreement (SLA) planning and fulfillment 742 provides pre-arrangement for, and procurement of, cloud computing resources for which a future requirement is anticipated in accordance with an SLA.

Workload layer 744 provides examples of functionality for which the cloud computing environment may be utilized. Examples of workloads and functions which may be provided from this layer include: mapping and navigation 746; software development and lifecycle management 748; virtual classroom education delivery 750; data analytics processing 752; transaction processing 754; and the cloud computing environments selector system 756 (compare also FIG. 5, 500).

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an, and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for identifying an optimal cloud computing environment for a computing task, the computer-implemented method comprising:
   receiving a computing task to be executed in a cloud computing environment, wherein the computing task requires a set of cloud computing environment parameter values of the cloud computing environment;
   preselecting a set of candidate cloud computing environments, each of which meets the set of cloud computing environment parameter values;

ranking the candidate cloud computing environments using reward-based ranking parameter values of the candidate cloud computing environments as an additional selection constraint;

selecting the highest ranking cloud computing environment as the optimal cloud computing environment for the computing task;

executing the computing task in the optimal cloud computing environment;

monitoring execution when executing the computing task; and updating parameter values of the reward-based ranking for the selected optimal cloud computing environment.

2. The method according to claim 1, wherein the cloud computing environment is a single cloud computing environment or a multi cloud computing environment.

3. The method according to claim 1, wherein the cloud computing environment comprises geographically distributed computing infrastructure components.

4. The method according to claim 1, further comprising:
determining, at an initialization time, an exploration parameter value and/or a maximum deviation parameter value.

5. The method according to claim 4, further comprising:
upon one of the candidate cloud computing environments having ranking that is greater than the a maximum deviation than the ranking of all other value candidate cloud computing environments, using the selected best cloud computing environments for received computing tasks in a predefined time window.

6. The method according to claim 4, wherein the ranking is also influenced by the exploration parameter value.

7. The method according to claim 1, further comprising:
maintaining a priority ordering of all the candidate clouds at all times.

8. The method according to claim 1, further comprising:
re-optimizing existing future schedules for computing tasks to be executed in case of a failure to execute a scheduled computing task.

9. The method according to claim 1, further comprising:
sharing parameters of the monitored execution with other users.

10. A cloud computing environments selector system for identifying an optimal cloud computing environment for a computing task, the system comprising:
a processor and a memory, communicatively coupled to the processor, wherein the memory stores program code portions that, when executed, enable the processor, to:
receive a computing task to be executed in a cloud computing environment, wherein the computing task requires a set of cloud computing environment parameter values of the cloud computing environment;
pre-select a set of candidate cloud computing environments, each of which meets the set of cloud computing environment parameter values;
rank the candidate cloud computing environments using reward-based ranking parameter values of the candidate cloud computing environments as an additional selection constraint;
select the highest ranking cloud computing environment as the optimal cloud computing environment for the computing task;
execute the computing task in the optimal cloud computing environment;
monitor execution when executing the computing task; and
update parameter values of the reward-based ranking for the selected optimal cloud computing environment.

11. The system according to claim 10, wherein the cloud computing environment is a single cloud computing environment or a multi cloud computing environment.

12. The system according to claim 10, wherein the cloud computing environment comprises geographically distributed computing infrastructure components.

13. The system according to claim 10, wherein the processor is also enabled to determine, at an initialization time, an exploration parameter value and/or a maximum deviation parameter value.

14. The system according to claim 13, wherein the processor is also enabled to upon one of the candidate cloud computing environments having ranking that is greater than the a maximum deviation than the ranking of all other value candidate cloud computing environments using the selected best cloud computing environments for received computing tasks in a predefined time window.

15. The system according to claim 14, wherein the ranking is also influenced by the exploration parameter value.

16. The system according to claim 10, wherein the processor is also enabled to maintain a priority ordering of all the candidate clouds at all times.

17. The system according to claim 10, wherein the processor is also enabled to re-optimize existing future schedules for computing tasks to be executed in case of a failure to execute a scheduled computing task.

18. The system according to claim 10, wherein the processor is also enabled to share parameters about the monitored execution with other users.

19. A computer program product for identifying an optimal cloud computing environment for a computing task, the computer program product comprising a computer readable storage medium having program instructions embodied therewith, the program instructions being executable by one or more computing systems or controllers to cause the one or more computing systems to:
receive a computing task to be executed in a cloud computing environment, wherein the computing task requires a set of cloud computing environment parameter values of the cloud computing environment;
pre-select a set of candidate cloud computing environments, each of which meets the set of cloud computing environment parameter values;
rank the candidate cloud computing environments using reward based ranking parameter values of the candidate cloud computing environments as an additional selection constraint;
select the highest ranking cloud computing environment as the optimal cloud computing environment for the computing task;
execute the computing task in the optimal cloud computing environment;
monitor execution when executing the computing task; and
updating parameter values of the reward-based ranking for the selected optimal cloud computing environment.

20. The computer program product according to claim 19, wherein the cloud computing environment is a single cloud computing environment or a multi cloud computing environment.

* * * * *